(12) United States Patent
Rombouts

(10) Patent No.: US 8,799,999 B2
(45) Date of Patent: Aug. 5, 2014

(54) AUTHENTICATION METHOD

(75) Inventor: Peter Maria Franciscus Rombouts, Sint-Katelijne-Waver (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 13/458,963

(22) Filed: Apr. 27, 2012

(65) Prior Publication Data

US 2012/0297449 A1    Nov. 22, 2012

(30) Foreign Application Priority Data

May 17, 2011    (EP) ..................................... 11166444

(51) Int. Cl.
*H04L 29/00* (2006.01)

(52) U.S. Cl.
USPC .............................................. 726/3; 713/155

(58) Field of Classification Search
USPC .............................................. 726/3; 713/155
See application file for complete search history.

(56) References Cited

U.S. PATENT DOCUMENTS

| 2003/0204743 A1 | 10/2003 | Devadas et al. | |
| 2008/0148043 A1* | 6/2008 | Lucidarme et al. | 713/155 |

FOREIGN PATENT DOCUMENTS

| DE | 10 2009 030 019 B3 | 12/2010 |
| WO | 93/09621 A1 | 5/1993 |

OTHER PUBLICATIONS

Extended European Search Report for EP Patent Appln. No. 11166444.7 (Sep. 7, 2011).
"Specification for RFID Air Interface—EPC Radio-Frequency Identity Protocols Class-1 Generation-2 UHF RFID Protocol for Communications at 860 MHz—960 MHz Version 1.2.0", EPCGlobal Inc., 108 pgs, retrieved from the internet at: http://www.gs1.org/gsmp/kc/epcglobal/uhfc1g2/uhfc1g2_1_2_0-standard-20080511.pdf (Oct. 23, 2008).
"Key Stretching", Wikipedia, 4 pgs, retrieved from the internet Mar. 20, 2014 at: http://en.wikipedia.org/wiki/Key_stretching (2011).
"Passwd", Wikipedia, 1 pg, retrieved from the internet Mar. 20, 2014 at: http://en.wikipedia.org/wiki/Passwd (2011).
"ISO/IEC 11770-4 Information Technology—Security Techniques—Key Management—Part 4: Mechanisms based on weak secrets", ISO/IEC, 38 pgs (May 1, 2006).

* cited by examiner

*Primary Examiner* — Jeffrey Pwu
*Assistant Examiner* — Michael D Anderson

(57) ABSTRACT

There is provided a method (100) of authenticating a first device (120) to a second device (110) based on a number of data elements and based on a predefined recombination function known by the first device and the second device. The method is executable by the first device and comprises receiving (101) an input signal by the first device from the second device, the input signal being indicative of selected ones of the data elements, generating (102), by the first device, an authentication signal by using the recombination function and based on the selected data elements as input elements, wherein the authentication signal represents a basis for the second device for authenticating the first device, and sending (103) the authentication signal to the second device.

15 Claims, 2 Drawing Sheets

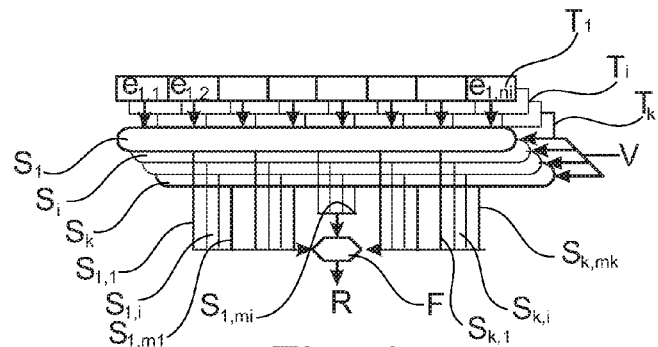
Fig. 4
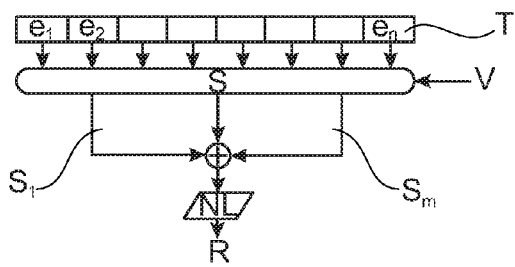
Fig. 5
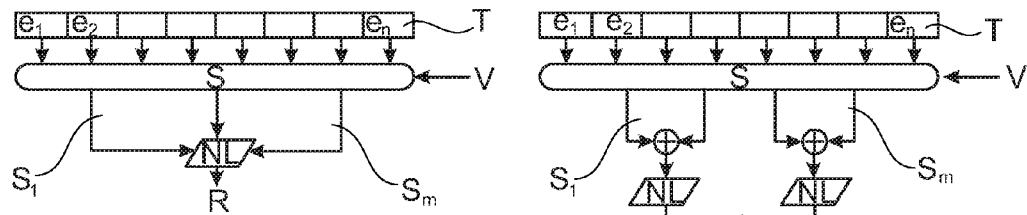
Fig. 6
Fig. 7
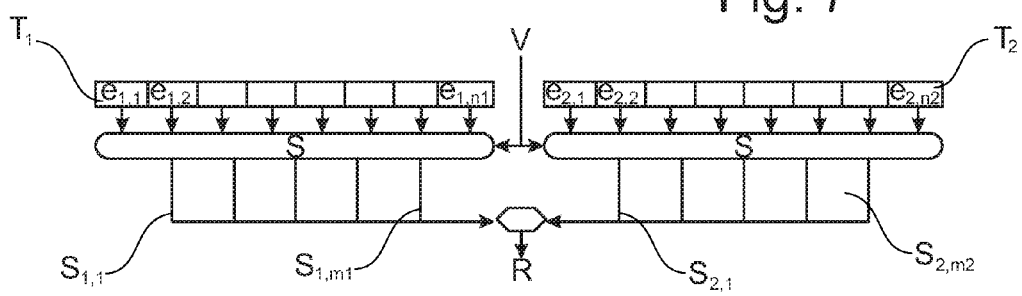
Fig. 8

AUTHENTICATION METHOD

CROSS-REFERENCE TO RELATED APPLICATIONS

This application claims the priority under 35 U.S.C. §119 of European patent application no. 11166444.7, filed on May 17, 2011, the contents of which are incorporated by reference herein.

FIELD OF THE INVENTION

The invention relates to a method of authenticating a first device to a second device based on a number of data elements and based on a predefined recombination function known by the first device and the second device, the method being executable by the first device.

Furthermore, the invention relates to a method of authenticating a first device to a second device based on a number of data elements and based on a predefined recombination function known by the first device and the second device, the method being executable by the second device.

Moreover, the invention relates to a first device for authenticating the first device to a second device based on a number of data elements and based on a predefined recombination function known by the first device and the second device.

Beyond this, the invention relates to a second device of authenticating a first device to the second device based on a number of data elements and based on a predefined recombination function known by the first device and the second device.

Furthermore, the invention relates to a program element.

Moreover, the invention relates to a computer-readable medium.

BACKGROUND OF THE INVENTION

On very resource constrained devices, for example smart cards or transponders, implementation of a cryptographic authentication protocol is more than often not an option. Such resource constrained devices often use passwords for authentication. Passwords provide a reasonable security against brute force attacks, for instance guessing an n bit password takes on average $2^{(n-1)}$ attempts. The problem is in the transmission of the password. A password need only be overheard once and it loses all its security. Many techniques to protect the password during transmission already exist based on techniques such as encryption (for example used in ISO standard), hashing (for example used in UNIX systems), blinding (for example EPC password blinding). The problem with these techniques is that they either are not suitable for implementation on resource constrained devices or that they provide no meaningful improvement in security.

OBJECT AND SUMMARY OF THE INVENTION

Hence, it is an object of the invention to provide an authentication method being secure and reliable and being usable also for resource constraint devices.

The object of the invention is achieved by a method being executable by a first device, a method being executable by a second device, a first device, a second device, a communication system, a program element and a computer-readable medium according to the independent claims.

According to an exemplary embodiment, a method of authenticating a first device to a second device based on a number of data elements and based on a predefined recombination function known by the first device and the second device is provided. The method is executable by the first device and comprises receiving an input signal by the first device from the second device, the input signal being indicative for selected ones of the data elements, generating, by the first device, an authentication signal by using the recombination function and based on the selected data elements as input elements, wherein the authentication signal represents a basis for the second device for authenticating the first device, and sending the authentication signal to the second device.

According to a further exemplary embodiment, a method of authenticating a first device to a second device based on a number of data elements and based on a predefined recombination function known by the first device and the second device is provided, the method being executable by the second device and comprising sending an input signal by the second device to the first device, the input signal being indicative for selected data elements, receiving an authentication signal by the second device from the first device, the authentication signal being generated by the first device based on the input signal, generating, by the second device, a comparison signal by using the recombination function and based on the selected data elements as input elements, wherein the comparison signal represents a basis for the second device for authenticating the first device, and comparing the comparison signal and the authentication signal for authenticating the first device.

According to still another exemplary embodiment, a first device for authenticating the first device to a second device based on a number of data elements and based on a predefined recombination function known by the first device and the second device is provided. The first device comprises a receiving unit for receiving an input signal from the second device, the input signal being indicative for selected ones of the data elements, a generating unit for generating an authentication signal by using the recombination function and based on the selected data elements as input elements, wherein the authentication signal represents a basis for the second device for authenticating the first device, and a sending unit for sending the authentication signal to the second device.

According to a further exemplary embodiment, a second device for authenticating a first device to the second device based on a number of data elements and based on a predefined recombination function known by the first device and the second device is provided. The second device comprises a sending unit for sending an input signal to the first device, the input signal being indicative for selected elements, a receiving unit for receiving an authentication signal from the first device, the authentication signal being generated by the first device based on the input signal, a generating unit for generating a comparison signal by using the recombination function and based on the selected data elements as input elements, wherein the comparison signal represents a basis for the second device for authenticating the first device, and a comparing unit for comparing the comparison signal and the authentication signal for authenticating the first device.

According to a further exemplary embodiment, a communication system is provided, the communication system comprising a first device and a second device having the above mentioned features.

According to a further exemplary embodiment, a computer-readable medium (for instance a CD, a DVD, a USB stick, a floppy disk or a harddisk) is provided, in which a computer program is stored, which computer program, when being executed by a processor, is adapted to carry out or control one of the above methods.

According to a further exemplary embodiment, a program element (for instance a software routine, in source code or in executable code, for instance a downloadable program) is provided, which program element, when being executed by a processor, is adapted to carry out or control one of the above mentioned methods.

Data processing which may be performed according to embodiments of the invention can be realized by a computer program, that is by software, or by using one or more special electronic optimization circuits, that is in hardware, or in hybrid form, that is by means of software components and hardware components.

In the following, embodiments of the invention will be described in further detail.

On very resource constrained devices implementation of a cryptographic authentication protocol is more than often not an option. Resource constrained devices often use passwords for authentication and although passwords provide a reasonable security against brute force attacks (guessing an n bit password takes on average $2^{(n-1)}$ attempts) the problem is in the transmission of the password. A password need only be overheard once and it loses all its security. The problem with common techniques is that they either are not suitable for implementation on resource constrained devices or that they provide no meaningful improvement in security. The existing techniques to protect the password from being overheard are not adequate for resource constrained devices.

Exemplary embodiments therefore describe a lightweight authentication method that replaces the cryptographic operation with stored data elements, for example by using a lookup table, and a few elementary operations that can provide a security level that is adequate for a wide range of applications that currently rely on passwords. The proposed technique may provide resistance against brute force attacks that is on par with the security level offered by passwords, but without the drawback that overhearing it during transmission breaks the security.

The described methods and devices replace the password with a number of data elements, being for example values, and instead of sending the values in clear; they are first recombined and then sent in the first device. Depending on the exact method of combination a large number of messages need to be overheard/intercepted before the values can be reconstructed by an attacker.

The term "input signal" may denote according to exemplary embodiments a signal comprising information about which elements should be used. The input signal may comprise for example a vector (or a challenge) comprising this information. Which elements are (to be) combined depends in this case on the vector, thus making the protocol interactive and more resistant against replay attacks.

The term "first device" may denote any kind of device being able to communicate with a further device and being adapted to carry out the described method. The first device may be for example a smart card or transponder, automatic fare collection cards or RFID tags.

The term "second device" may denote any kind of device being able to communicate with a further device and being adapted to carry out the described method. The second device may be for example a reader device.

The term "data element" may denote binary values, integer values, points on an elliptic curve or the like. Elliptic curves over a finite field (usually GF(P) or GF($2^m$)) are well known to be used in cryptography.

The term "recombination function" may denote a calculation specification or function, for example a rule how to recombine the selected data elements.

The authentication method may be used for a single sided authentication whereby a first device A authenticates to a second device B. The method can also be extended to a mutual authentication.

A and B may be initialized with the same number of data elements, which means that the same set of data elements is known to A and B. Further, A and B may be set up to use the same recombination function(s). If A and B have stored a plurality of recombination functions, the recombination function may be selected together with the data elements or by a further signal.

The described communication system may be adapted to carry out the method being executable by the first device and the method being executable by the second device.

In the following, further exemplary embodiments of the method being executable by the first device will be explained. However, these embodiments also apply to the method being executable by the second device, to the first device, to the second device, to the communication system, to the program element and to the computer-readable medium.

Generating the authentication signal may comprise retrieving the selected data elements from at least one lookup table being stored in the first device by using a selection function, wherein the selection function selects the selected elements from the at least one lookup table based on the input signal.

The lookup table may be stored in the first device. The second device may also know and use the lookup table (or an equivalent one) in order to generate a comparison signal.

In a further embodiment, different lookup tables and recombination functions may be used in the first and the second device, respectively. For example in the case of elliptic curve points, one table might contain scalars and the other table might contain elliptic curve points that are equal to the multiplication of a fixed base point with the corresponding scalars from the first table. The corresponding recombination functions may be scalar addition and point addition respectively. The comparison may be based on comparing the point sum with the multiplication of the scalar sum with the base point.

The selection function may behave the same on both devices, as well. When using different tables, for example when the tables are permuted, the selection function may apply the inverse permutation.

Depending on the recombination function, several selection scenarios may be possible (assuming for example a table of n elements, N is the number of possible input vectors/challenges), for instance:

- Selection of a fixed number (m) of elements, where the recombination does not depend on the order of the elements: $N=comb(m, n)=n!/(m!*(n-m)!)$
- Selection of an arbitrary number (m) of elements, where the recombination does not depend on the order of the elements: $N=2^n$
- Selection of a bounded number (m) of elements, where the recombination does not depend on the order of the elements: N in range $1 \ldots 2^n$
- Selection of an fixed number (m) of elements, where the recombination depends on the order of the elements: $N=comb(m, n)*m!=n!/(n-m)!$ Also other selection functions may be possible. In all cases, it may be clearly understood that N grows very fast in function of n (exponentially in most cases), which might make 'harvesting' or brute forcing all the responses to all possible challenges or vectors impossible or at least very hard for sufficiently large n.

The method being executable by the first device may further comprise at least one of the following features: wherein the recombination function performs a linear recombination of the selected data elements and a non-linear transformation of the result of the linear recombination for generating the authentication signal, wherein the recombination function performs a non-linear recombination of the selected data elements for generating the authentication signal, wherein the recombination function performs the recombination of the selected data elements by considering the order of the selected data elements.

The first and the second device may use a predefined recombination function. The recombination function may be predefined before the communication between the devices or may be selected by adding corresponding information to the input signal. Further, by adding non-linearity to the recombination, the security may be enhanced in view of attacks, for example trying to reconstruct the tables.

Generating the authentication signal may comprise retrieving the selected data elements from a plurality of lookup tables being stored in the first device by using a selection function.

A plurality of lookup tables may be stored in the first device. The first device may directly access the lookup table. The selection function may use the input signal or selection vector to get the information which elements should be retrieved from a predefined lookup table.

The selection function may retrieve the selected data elements from at least two of the plurality of lookup tables based on the input signal. The plurality of lookup tables may comprise different types of data elements. This may mean that one lookup table comprises one type of data elements and that the other lookup tables comprise also one type of data elements, which is different to the other type of data elements in the other lookup tables. In the recombination function, different types of data elements may be combined.

In the following, further exemplary embodiments of the method being executable by the second device will be explained. However, these embodiments also apply to the method being executable by the first device, to the first device, to the second device, to the communication system, to the program element and to the computer-readable medium.

Generating the comparison signal comprises retrieving the selected data elements from at least one lookup table being stored in the second device by using a selection function, wherein the selection function selects the selected elements from the at least one lookup table based on the input signal.

The lookup table may be stored in the second device as explained above. The first device may also know and use the lookup table (or an equivalent one) in order to generate an authentication signal.

In a further embodiment, different lookup tables and recombination functions may be used in the first and the second device, respectively. For example in the case of elliptic curve points, one table might contain scalars and the other table might contain elliptic curve points that are equal to the multiplication of a fixed base point with the corresponding scalars from the first table. The corresponding recombination functions may be scalar addition and point addition respectively. The comparison may be based on comparing the point sum with the multiplication of the scalar sum with the base point.

The selection function may behave the same on both devices, as well. When using different tables, for example when the tables are permuted, the selection function may apply the inverse permutation.

The first device, A, and the second device, B, may be set up to use the same selection functions and recombination functions. For each device, the lookup table may be stored in the respective device.

The method may further comprise at least one of the following features: wherein the recombination function performs a linear recombination of the selected data elements and a non-linear transformation of the result of the linear recombination for generating the comparison signal, wherein the recombination function performs a non-linear recombination of the selected data elements for generating the comparison signal, wherein the recombination function performs the recombination of the selected data elements by considering the order of the selected data elements.

Generating the comparison signal comprises retrieving the selected data elements from a plurality of lookup tables being stored in the second device by using a selection function.

The selection function may retrieve the selected data elements from at least two of the plurality of lookup tables based on the input signal, wherein the plurality of lookup tables may comprise different types of data elements.

According to herein described embodiments, the first device may authenticate itself to the second device by generating the authentication signal. The second device may generate the comparison signal for authentication of the first device, or in other words for verifying the first device based on a comparison of the comparison signal and the authentication signal.

The aspects defined above and further aspects of the invention are apparent from the examples of embodiment to be described hereinafter and are explained with reference to these examples of embodiment.

BRIEF DESCRIPTION OF THE DRAWINGS

The invention will be described in more detail hereinafter with reference to examples of embodiment but to which the invention is not limited.

FIG. 4 illustrates a schematic selection and recombination according to an exemplary embodiment of the invention.

FIG. 5 illustrates a schematic selection and recombination according to a further exemplary embodiment of the invention.

FIG. 6 illustrates a schematic selection and recombination according to a further exemplary embodiment of the invention.

FIG. 7 illustrates a schematic selection and recombination according to a further exemplary embodiment of the invention.

FIG. 8 illustrates a schematic selection and recombination according to a further exemplary embodiment of the invention.

DESCRIPTION OF EMBODIMENTS

Figure 1:
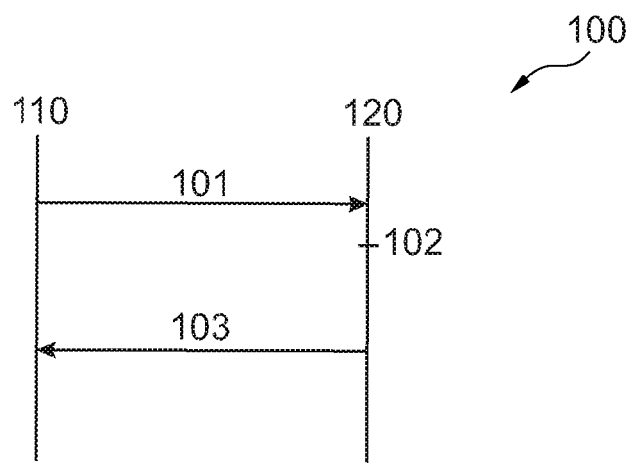
FIG. 1 illustrates a method of authentication being executable by the first device according to an exemplary embodiment of the invention.

The illustration in the drawing is done schematically. In different drawings, similar or identical elements are provided with the same reference signs.

FIG. 1 illustrates a method 100 of authentication being executable by the first device according to an exemplary embodiment of the invention.

According to this embodiment, a first device 120 is authenticated to a second device 110. Both devices have knowledge about a number of data elements and a predefined recombination function. The method is executable by the first device. In a first step, an input signal is received by the first device from the second device (101). The input signal is indicative of selected data elements. For example, the input signal may comprise a vector comprising information about the selection. The first device then generates an authentication signal by using the predefined recombination function and based on the selected data elements as input elements (102). The authentication signal represents a basis for the second device for authenticating the first device. The first device then sends authentication signal to the second device (103).

Figure 2:
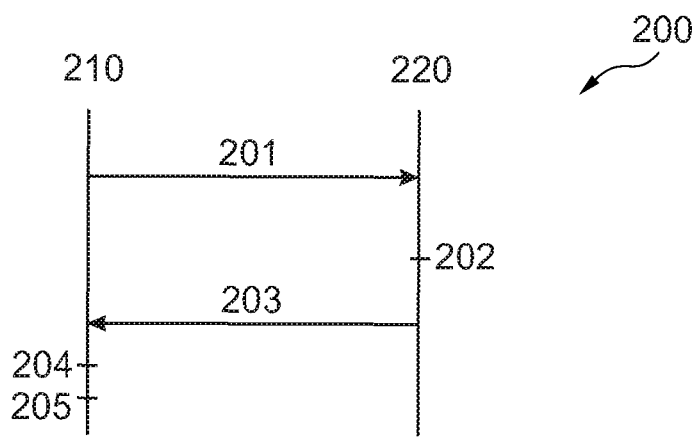
FIG. 2 illustrates a method of authentication being executable by the second device according to a further exemplary embodiment of the invention.

FIG. 2 illustrates a method 200 of authentication being executable by the second device according to a further exemplary embodiment of the invention.

The second device 210 sends an input signal to the first device 220, wherein the input signal is indicative for selected elements (201). The first device generates an authentication signal based on the input signal (202) as explained in FIG. 1 and sends this signal to the second device. The second device receives the authentication signal from the first device (203).

The second device then generates a comparison signal by using the recombination function and based on the selected data elements as input elements, wherein the comparison signal represents a basis for the second device for authenticating the first device (204). Step 204 may be carried out also simultaneously with or before the steps 202 and 203. Following to the steps 201-204, the second device compares the comparison signal and the authentication signal for authenticating the first device (205).

Following the authentication, the second device may establish a communication to the first device or not, based on the result of the authentication. This may be done by using common procedures and techniques.

Figure 3:
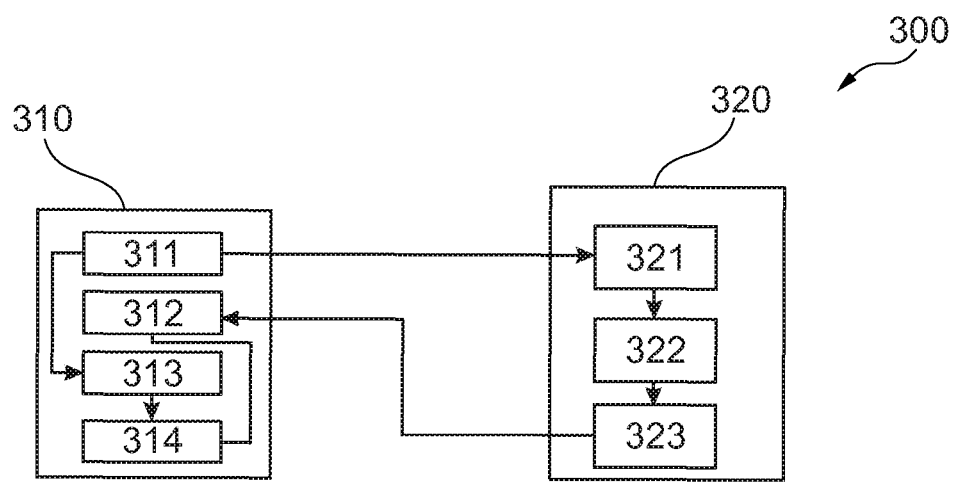
FIG. 3 illustrates a communication system comprising a first and a second device according to an exemplary embodiment of the invention.

FIG. 3 illustrates a communication system 300 comprising a first 320 and a second device 310 according to an exemplary embodiment of the invention.

The first device comprises a receiving unit 321 for receiving an input signal from the second device. The input signal is indicative of selected data elements, as explained with FIGS. 1 and 2. The first device comprises further a generating unit 322 for generating an authentication signal by using the recombination function and based on the selected data elements as input elements. The receiving unit forwards the input signal to the generating unit. The generated authentication signal represents a basis for the second device for authenticating the first device and is forwarded to a sending unit 323, which sends the authentication signal to the second device.

The receiving and the sending unit may be separate units or may be combined in one single unit providing sending or transmitting and receiving features. These units may be for example a transceiver as known in the art. The generating unit may be a single unit or may be part of a central processing unit.

The first device is able to communicate with the second device 310 for authenticating the first device to the second. The second device comprises a sending unit 311 for sending the input signal to the first device. The input signal may be generated by using for instance a pseudo-random function. Therefore, the input signal may be unpredictable. The second device comprises further a receiving unit 312 for receiving the authentication signal from the first device. The sending and the receiving units may be separate units or may be combined in one single unit providing sending or transmitting and receiving features. These units may be for example a transceiver as known in the art.

The second device comprises further a generating unit 313 being coupled to the sending unit. The generating unit is adapted for generating a comparison signal by using the recombination function and based on the selected data elements as input elements, wherein the comparison signal represents a basis for the second device for authenticating the first device. The second device also comprises a comparing unit 314 for comparing the comparison signal and the authentication signal for authenticating the first device. The comparison unit receives the authentication signal from the receiving unit and the comparison signal from the generating unit.

The generating unit and the comparison unit may be single units or may be a combined unit or may be part of a central processing unit.

In the following, the selection and recombination will be explained in greater detailed based on some exemplary embodiments, to which the invention is not limited.

FIG. 4 illustrates a schematic selection and recombination according to an exemplary embodiment of the invention.

The authentication method and the device may be based on a number of building blocks:

1. One or more tables $T_i$ holding $n_i$ elements each. All elements of one table may be of the same type, but different tables can contain different types of elements. The types of elements in the tables depend on the types accepted by the recombination function F. Possible types are for example a binary value or a point on an elliptic curve $$T_i = [e_{i,1}, e_{i,2}, \ldots, e_{i,ni-1}, e_{i,ni}], i=1 \text{ to } k$$

2. A selection function S that selects multiple elements from each of the tables $T_i$, namely for each table $T_i$ it selects $m_i$ elements from the $n_i$ elements of table $T_i$, and passes them through to the recombination function F. The selection function takes a selection vector V as input to determine which elements shall be selected.

$$[[s_{1,1}, s_{1,2}, \ldots, s_{1,m1-1}, s_{1,m1}], \ldots, [s_{i,1}, s_{i,2}, \ldots, s_{i,mi-1}, s_{i,mi}], \ldots, [s_{k,1}, s_{k,2}, \ldots, s_{k,mk-1}, s_{k,mk}]] = S(V, T_1, \ldots, T_i, \ldots T_k)$$

3. A recombination function F that combines all the $m_i$ selected elements $s_{i,j}$ from each of the tables $T_i$ into a single output vector R.

$$R = F([s_{1,1}, s_{1,2}, \ldots, s_{1,mi-1}, s_{1,mi}], \ldots, [s_{i,1}, s_{i,2}, \ldots, s_{i,mi-1}, s_{i,mi}], \ldots, [s_{ni,1}, s_{ni,2}, \ldots s_{ni,mi-1}, s_{ni,mi}])$$

The authentication method (protocol) for a single sided authentication whereby a first device, A, authenticates to a second device, B, proceeds as described below.

A and B are initialized with the same tables $T_i$ and are set up to use the same selection functions S and recombination functions F.

B prepares a selection vector (challenge) V and sends this to A. A selects the inputs corresponding to the selection vector V using the selection function S and feeds them to the recombination function F producing an output vector R. A sends the output vector R to B. B selects the inputs corresponding to the selection vector V using the selection function S and feeds them to the recombination function F producing an output vector R'. B compares the output vectors R and R' to determine if the authentication succeeded.

In the following, some considerations, which might be taken into account when using the authentication method, will be explained.

The recombination function F may be sensitive to the order in which some or all of the elements are presented; that means for example, it may be sensitive to the order of the elements from a table $T_i$ but not from a table $T_j$.

In case the recombination function is sensitive to the order of a subset of its elements, selection function S should take this into account. The order of the elements may be encoded in the selection vector or it may be determined by the selection function.

The recombination function F may take a fixed number of inputs $m_i$ per table $T_i$ or the number $m_i$ may be variable. In case the recombination function accepts a variable number of inputs, the selection vector may encode a variable number of elements and the selection function S should take this into account.

The recombination function can be any function that accepts inputs of the types from the tables $T_i$ and produces an output vector based on all of its input values. For security considerations it might be advisable that this function includes some non-linearity.

The following embodiments are provided as an example of practical implementations of the authentication method.

FIG. 5 illustrates a schematic selection and recombination according to a further exemplary embodiment of the invention. In this embodiment, a linear recombination is followed by a non-linear output transformation, the order of the elements is not important.

This embodiment uses one table T with n binary values $e_i$ of $l_e$ bits. The selection function S selects m elements $s_i$ and passes them to the recombination function which consists of an XOR operation followed by a non-linear transformation NL producing an output R of $l_R$ bits.

The length $l_R$ of the output vector R might be chosen sufficiently large such as to limit the probability for an attacker to guess the right response to an acceptable level. This probability is equal to $2^{-E_R}$, where $E_R$ is the entropy of the output vector. The entropy of the output vector is at most equal to $l_R$. The entropy of the output of the non-linear transformation NL might be $E_{NL}$ lower than the entropy of its input. For efficiency reasons a non-linear transformation NL might be chosen with $E_{NL}=0$. Since a XOR operation does not reduce the entropy of the input the entropy $E_e$ of the binary values $e_i$ the entropies are related by $E_e \approx E_R + E_{NL}$. The entropy of each the table elements $e_i$ is at most equal to $l_e$ with equality holding if the $e_i$ are chosen independently from a uniform distribution.

The minimal number of bits required to encode V is equal to $$\log_2(comb(m, n)) = \log_2\left(\binom{n}{m}\right);$$

for practical reasons however a bit vector of length n of which exactly m bits are set is preferable.

There are $$comb(m, n) = \binom{n}{m} = \frac{n!}{m!(n-m)!}$$

possible ways to select m elements from a set of n elements. This number should be sufficiently large as to prevent dictionary attacks where an attacker would just capture all the replies to all possible selection vectors. The number n of elements in the table should be chosen sufficiently large for this reason. The number m of elements that is selected should be chosen with more care as a large value of m will require a large number of XOR operations to be performed, but a small value of m will result in a smaller number of possible ways to select the m elements. Ideally m should be close to but smaller than half of n:

$$m <= \frac{n}{2} \text{ and } m \approx \frac{n}{2}.$$

Ideally also m should be chosen such that the entropy of the input vector is approximately that of the output vector; this implies that $$\log_2\left(\binom{n}{m}\right) \approx l_e \approx l_R.$$

FIG. 6 illustrates a schematic selection and recombination according to a further exemplary embodiment of the invention. In this embodiment, a non-linear recombination is used, wherein the order of the elements is important.

This embodiment uses one table T with n binary values $e_i$ of $l_e$ bits. The selection function S selects m elements $s_i$ and passes them to the non-linear recombination function NL producing an output R of $l_R$ bits.

The length $l_R$ of the output vector R should be sufficiently large such as to limit the probability for an attacker to guess the right response to an acceptable level. This probability is equal to $2^{-l_R}$.

The minimal number of bits required to encode V is equal to $$\log_2\left(\frac{n!}{(n-m)!}\right),$$

however for practical reasons a sequence of m values $x_i < n$ is preferable.

There are $$comb(m, n) = \binom{n}{m} = \frac{n!}{m!(n-m)!}$$

possible ways to select m elements from a set of n elements and perm(m)=m! ways to permute them resulting in $$\frac{n!}{(n-m)!}$$

different selection vectors. This number should be sufficiently large as to prevent dictionary attacks where an attacker would just capture all the replies to all possible selection vectors. The number n of elements in the table should be chosen sufficiently large for this reason. The number m of elements that is selected should be chosen with more care as a large value of m will require a very complex recombination function, but a small value of m will result in a smaller number of possible selection vectors. Ideally m should be chosen such that the entropy of the input vector is approximately that of the output vector; this implies that $$\log_2\left(\frac{n!}{(n-m)!}\right) \approx l_R.$$

FIG. 7 illustrates a schematic selection and recombination according to a further exemplary embodiment of the invention. In this embodiment, the selection and recombination blocks of FIGS. 5 and 6 are combined.

FIG. 8 illustrates a schematic selection and recombination according to a further exemplary embodiment of the invention. In this embodiment, a recombination function is shown that takes inputs of different types, for example binary value and elliptic curve point, from two tables.

This embodiment uses two tables $T_1$ and $T_2$ with $n_1$ binary values $e_{1,i}$ of $l_e$ bits and $n_2$ elliptic curve points respectively. The selection function S selects m1 elements $s_{1,i}$ from $T_1$ and $m_2$ elements $s_{2,i}$ from $T_2$ and passes them to the recombination function producing an output R of $l_R$ bits.

The entropy $E_R$ of the output vector R should be sufficiently large such as to limit the probability for an attacker to guess the right response to an acceptable level. This probability is equal to $2^{-E_R}$. The entropy $E_R$ of the output is at most equal to the length $l_R$ of the output vector.

The minimal number of bits required to encode V depends on whether the recombination function is sensitive to the order of the elements, as already explained above.

The number of possible values for V should be sufficiently large as to prevent dictionary attacks where an attacker would just capture all the replies to all possible selection vectors. The number $n_1+n_2$ of elements in the two tables should be chosen sufficiently large for this reason. The number m of elements that is selected should be chosen with more care as a large value of m will require a very complex recombination function, but a small value of m will result in a smaller number of possible selection vectors.

It should be noted that the term "comprising" does not exclude other elements or features and the "a" or "an" does not exclude a plurality. Also elements described in association with different embodiments may be combined.

It should also be noted that reference signs in the claims shall not be construed as limiting the scope of the claims.

The invention claimed is:

1. A method of authenticating a first device to a second device based on a number of stored data elements and based on a predefined recombination function known by the first device and the second device, the method being executable by the first device and comprising:
   receiving an input signal by the first device from the second device, the input signal being indicative of selected ones of the stored data elements;
   generating, by the first device, an authentication signal by using the predefined nonlinear recombination function and based on the selected ones of the stored data elements as input elements, wherein the authentication signal represents a basis for the second device for authenticating the first device; and
   sending the authentication signal to the second device.

2. The method according to claim 1, wherein generating the authentication signal comprises:
   retrieving the selected ones of the stored data elements from at least one lookup table stored in the first device by using a selection function, wherein the selection function selects the selected ones of the stored data elements from the at least one lookup table based on the input signal.

3. The method according to claim 1, comprising at least one of the following features:
   wherein the predefined recombination function performs a linear recombination of the selected ones of the stored data elements and a non-linear transformation of the result of the linear recombination for generating the authentication signal, the predefined recombination function performs a non-linear recombination of the selected ones of the stored data elements for generating the authentication signal, and the predefined recombination function performs the recombination of the selected ones of the stored data elements by considering an order of the selected ones of the stored data elements.

4. The method according to claim 1, wherein generating the authentication signal comprises:
   retrieving the selected ones of the stored data elements from a plurality of lookup tables stored in the first device by using a selection function.

5. The method according to claim 4, wherein the selection function retrieves the selected ones of the stored data elements from at least two of the plurality of lookup tables based on the input signal, and the plurality of lookup tables comprises different types of data elements.

6. A method of authenticating a first device to a second device based on a number of stored data elements and based on a predefined recombination function known by the first device and the second device, the method being executable by the second device and comprising:
   sending an input signal by the second device to the first device, the input signal being indicative for selected ones of the stored data elements;
   receiving an authentication signal by the second device from the first device, the authentication signal being generated by the first device based on the input signal;
   generating, by the second device, a comparison signal by using the predefined nonlinear recombination function and based on the selected ones of the stored data elements as input elements, wherein the comparison signal represents a basis for the second device for authenticating the first device; and
   comparing the comparison signal and the authentication signal for authenticating the first device.

7. The method according to claim 6, wherein generating the comparison signal comprises:
   retrieving the selected ones of the stored data elements from at least one lookup table stored in the second device by using a selection function, wherein the selection function selects the selected ones of the stored elements from the at least one lookup table based on the input signal.

8. The method according to claim 6, comprising at least one of the following features: wherein the predefined recombination function performs a linear recombination of the selected ones of the stored data elements and a non-linear transformation of the result of the linear recombination for generating the comparison signal, the predefined recombination function performs a non-linear recombination of the selected ones of the stored data elements for generating the comparison signal, the predefined recombination function performs the recombination of the selected ones of the stored data elements by considering an order of the selected data elements.

9. The method according to claim 6, wherein generating the comparison signal comprises:
retrieving the selected ones of the stored data elements from a plurality of lookup tables stored in the second device by using a selection function.

10. The method according to claim 9, wherein the selection function retrieves the selected ones of the stored data elements from at least two of the plurality of lookup tables based on the input signal, and the plurality of lookup tables comprises different types of data elements.

11. A first device for authenticating the first device to a second device based on a number of stored data elements and based on a predefined recombination function known by the first device and the second device, the first device comprising:
a receiving unit configured to receive an input signal from the second device, the input signal being indicative of selected ones of the stored data elements;
a generating unit configured to generate an authentication signal by using the predefined recombination function and based on the selected ones of the stored data elements as input elements, wherein the authentication signal represents a basis for the second device for authenticating the first device; and
a sending unit configured to send the authentication signal to the second device.

12. A second device for authenticating a first device to the second device based on a number of stored data elements and based on a predefined nonlinear recombination function known by the first device and the second device, the second device comprising:
a sending unit configured to send the input signal to the first device, the input signal being indicative for selected ones of the stored data elements;
a receiving unit configured to receive an authentication signal from the first device, the authentication signal being generated by the first device based on the input signal;
a generating unit configured to generate a comparison signal by using the predefined recombination function and based on the selected ones of the stored data elements as input elements, wherein the comparison signal represents a basis for the second device for authenticating the first device; and
a comparing unit configured to compare the comparison signal and the authentication signal for authenticating the first device.

13. A communication system comprising:
the first device according to claim 11; and
a second device configured to authenticate the first device to the second device based on the number of stored data elements and based on the predefined recombination function known by the first device and the second device, the second device comprising:
a sending unit configured to send an input signal to the first device, the input signal being indicative for selected ones of the data elements,
a receiving unit configured to receive the authentication signal from the first device, the authentication signal being generated by the first device based on the input signal,
a generating unit configured to generate a comparison signal by using the predefined recombination function and based on the selected ones of the stored data elements as input elements, wherein the comparison signal represents a basis for the second device for authenticating the first device, and
a comparing unit configured to compare the comparison signal and the authentication signal for authenticating the first device.

14. A non-transitory computer-readable medium, in which a computer program is stored, wherein the computer program, when being executed by a processor, is configured to carry out or control the method according to claim 1.

15. A program element, wherein the program element, when being executed by a processor, is configured to carry out or control the method according to claim 1.

* * * * *